(12) United States Patent
Allsup

(10) Patent No.: US 6,411,472 B1
(45) Date of Patent: Jun. 25, 2002

(54) DUAL METAL LAMINATE TOLERANCE RING FOR ACOUSTIC AND VIBRATION DAMPING

(75) Inventor: David S. Allsup, Oklahoma City, OK (US)

(73) Assignee: Seagate Technology LLC, Scotts Valley, CA (US)

( * ) Notice: Subject to any disclaimer, the term of this patent is extended or adjusted under 35 U.S.C. 154(b) by 0 days.

(21) Appl. No.: 09/522,989

(22) Filed: Mar. 10, 2000

Related U.S. Application Data

(60) Provisional application No. 60/130,307, filed on Apr. 21, 1999.

(51) Int. Cl.[7] .................................................. G11B 5/55
(52) U.S. Cl. ...................................................... 360/265.7
(58) Field of Search ............................ 360/97.02, 99.12, 360/265.7, 266.1

(56) References Cited

U.S. PATENT DOCUMENTS 5,675,456 A * 10/1997 Myers ...................... 360/97.02
5,930,071 A * 7/1999 Back ....................... 360/97.01
6,163,441 A * 12/2000 Wood ....................... 360/266.1

\* cited by examiner

Primary Examiner—A. J. Heinz
(74) Attorney, Agent, or Firm—Derek J. Berger; Shawn B. Dempster

(57) ABSTRACT

A disc drive, includes a base, a disc stack rotatably attached to the base, and an actuator assembly movably attached to the base. The actuator assembly includes arms on one end for holding the one or more transducers and a portion of a voice coil motor on the other end of the actuator assembly. A bearing cartridge is attached to an opening in the actuator assembly. A tolerance ring is used to attach the bearing cartridge to the opening in the actuator assembly. The tolerance ring includes a dampening material therein. The tolerance ring includes a layer of viscoelastic material which can be a viscoelastic damping adhesive material. The viscoelastic material is sandwiched between the first layer of metallic material and the second layer of metallic material. The tolerance ring includes a plurality of ridges formed about the periphery of the tolerance ring.

23 Claims, 7 Drawing Sheets

DUAL METAL LAMINATE TOLERANCE RING FOR ACOUSTIC AND VIBRATION DAMPING

RELATED APPLICATION

This application claims the benefit of U.S. Provisional Application Ser. No. 60/130,307, filed Apr. 21, 1999 under 35 U.S.C. 119(e).

FIELD OF THE INVENTION

The present invention relates to the field of mass storage devices. More particularly, this invention relates to an apparatus and method for vibrational and acoustic dampening of the actuator assembly in a disc drive.

BACKGROUND OF THE INVENTION

One key component of any computer system is a device to store data. Computer systems have many different places where data can be stored. One common place for storing massive amounts of data in a computer system is on a disc drive. The most basic parts of a disc drive are a disc that is rotated, an actuator that moves a transducer to various locations over the disc, and electrical circuitry that is used to write and read data to and from the disc. The disc drive also includes circuitry for encoding data so that it can be successfully retrieved and written to the disc surface. A microprocessor controls most of the operations of the disc drive as well as passing the data back to the requesting computer and taking data from a requesting computer for storing to the disc.

The transducer is typically placed on a small ceramic block, also referred to as a slider, that is aerodynamically designed so that it flies over the disc. The slider is passed over the disc in a transducing relationship with the disc. Most sliders have an air-bearing surface ("ABS") which includes rails and a cavity between the rails. When the disc rotates, air is dragged between the rails and the disc surface causing pressure, which forces the head away from the disc. At the same time, the air rushing past the cavity or depression in the air bearing surface produces a negative pressure area. The negative pressure or suction counteracts the pressure produced at the rails. The slider is also attached to a load spring which produces a force on the slider directed toward the disc surface. The various forces equilibrate so the slider flies over the surface of the disc at a particular desired fly height. The fly height is the distance between the disc surface and the transducing head, which is typically the thickness of the air lubrication film. This film eliminates the friction and resulting wear that would occur if the transducing head and disc were in mechanical contact during disc rotation. In some disc drives, the slider passes through a layer of lubricant rather than flying over the surface of the disc.

Information representative of data is stored on the surface of the storage disc. Disc drive systems read and write information stored on tracks on storage discs. Transducers, in the form of read/write heads attached to the sliders, located on both sides of the storage disc, read and write information on the storage discs when the transducers are accurately positioned over one of the designated tracks on the surface of the storage disc. The transducer is also said to be moved to a target track. As the storage disc spins and the read/write head is accurately positioned above a target track, the read/write head can store data onto a track by writing information representative of data onto the storage disc. Similarly, reading data on a storage disc is accomplished by positioning the read/write head above a target track and reading the stored material on the storage disc. To write on or read from different tracks, the read/write head is moved radially across the tracks to a selected target track.

A continuous goal in the manufacture of disc drives is to design a disc drive with higher data capacity. Currently, the data capacity of disc drives across the industry grows at approximately sixty percent per year. One way to increase the capacity of a disc drive is to increase the track density on the recording surface of the disc. The data is stored on the tracks. In some disc drives, the tracks are a multiplicity of concentric circular tracks. In other disc drives, a continuous spiral is one track on one side of a disc drive. By packing the tracks more closely together, more data can be stored on the disc. One constraint that prevents designs with more closely spaced tracks is the fact that the actuator assembly has a resonant frequency or moves in a direction transverse to the track during track following operations. Since the track must be followed in order to read data from the disc surface, the track must be wide enough so that the transducer remains positioned over a track. A device that reduces vibration allows for more closely spaced tracks. One source of transverse movement in a bearing cartridge occurs from imperfections in the ball bearings as they roll against the ball bearing raceways.

Another problem associated with current actuators includes high settle times. At certain times, a seek is performed to move the transducer attached to the free end of the actuator assembly from a first track to a second track. During seeks where multiple tracks are crossed, the actuator follows a velocity profile. At the end of the seek, the actuator is stopped and actually settles over the target track where the next data to be read is stored. In many disc drives, the actuator "rings" or vibrates across the track. The data can not be accessed until the actuator settles down or the ringing slows. This results in increased access time. Decreasing the access time is another constant goal in disc drive design.

What is needed is an actuator assembly that has improved settling characteristics after a seek from a first track on the disc to a target track on the disc. What is further needed is an actuator assembly with minimized vibration during track following operations of the disc drive. In other words, there is a need for an actuator assembly that has improved vibration characteristics while under any type of servo control. What is also needed is a device that will accommodate thermal mismatches that might occur between the bearing cartridge and the E-block as the disc drive heats from a starting temperature to an operating temperature. In addition, there is a need for an actuator assembly that results in reduced damage to assembled components of the actuator assembly as a result of a shock event. Still a further need is an actuator assembly with reduced acoustical noise related to rotating bearings. Also needed is a device that can be assembled using current assembly techniques.

SUMMARY OF THE INVENTION

A disc drive, includes a base, a disc stack rotatably attached to the base, and an actuator assembly movably attached to the base. Attached to one end of the actuator assembly is one or more transducers. The actuator assembly includes arms on one end for holding the one or more transducers and a portion of a voice coil motor on the other end of the actuator assembly. The voice coil motor moves the actuator assembly and the transducers attached thereto to various locations over the disc where data is located. The actuator assembly has an opening therein. A bearing cartridge is attached to the opening in the actuator assembly. A tolerance ring is used to attach the bearing cartridge to the opening in the actuator assembly. The tolerance ring includes a layer of viscoelastic material. The viscoelastic material is sandwiched between the first layer of metallic material and the second layer of metallic material. The tolerance ring is a plurality of ridges formed about the periphery of the tolerance ring. The ridges may be formed in an arcuate shape or having an arcuate cross section. The tolerance ring is dimensioned so that attachment of the bearing cartridge and tolerance ring to the actuator assembly requires a press fit. The dimensions of the tolerance ring are selected so that the natural frequency of the actuator assembly is not matched to the natural frequency of the tolerance ring.

Advantageously, the method and apparatus described for attaching the bearing cartridge and the E-block or comb to form the actuator assembly has improved settling characteristics after a track to track. Vibration in the actuator assembly is minimized during track following operations of the disc drive. The actuator assembly has improved vibration characteristics while under any type of servo control. The actuator assembly also accommodates thermal mismatches that might occur between the bearing cartridge and the E-block as the disc drive heats from a starting temperature to an operating temperature. The tolerance ring also absorbs vibrations resulting from imperfections in the bearings as they roll within the race of the bearing set within the bearing cartridge. Still another advantage is reduced damage to assembled components of the actuator assembly as a result of a shock event. The actuator assembly with the tolerance ring including the damping material has reduced acoustical noise related to the rotating bearings. The actuator assembly can also be assembled using current assembly techniques.

DESCRIPTION OF THE PREFERRED EMBODIMENT

In the following detailed description of the preferred embodiments, reference is made to the accompanying drawings which form a part hereof, and in which are shown by way of illustration specific embodiments in which the invention may be practiced. It is to be understood that other embodiments may be utilized and structural changes may be made without departing from the scope of the present invention.

Figure 1:
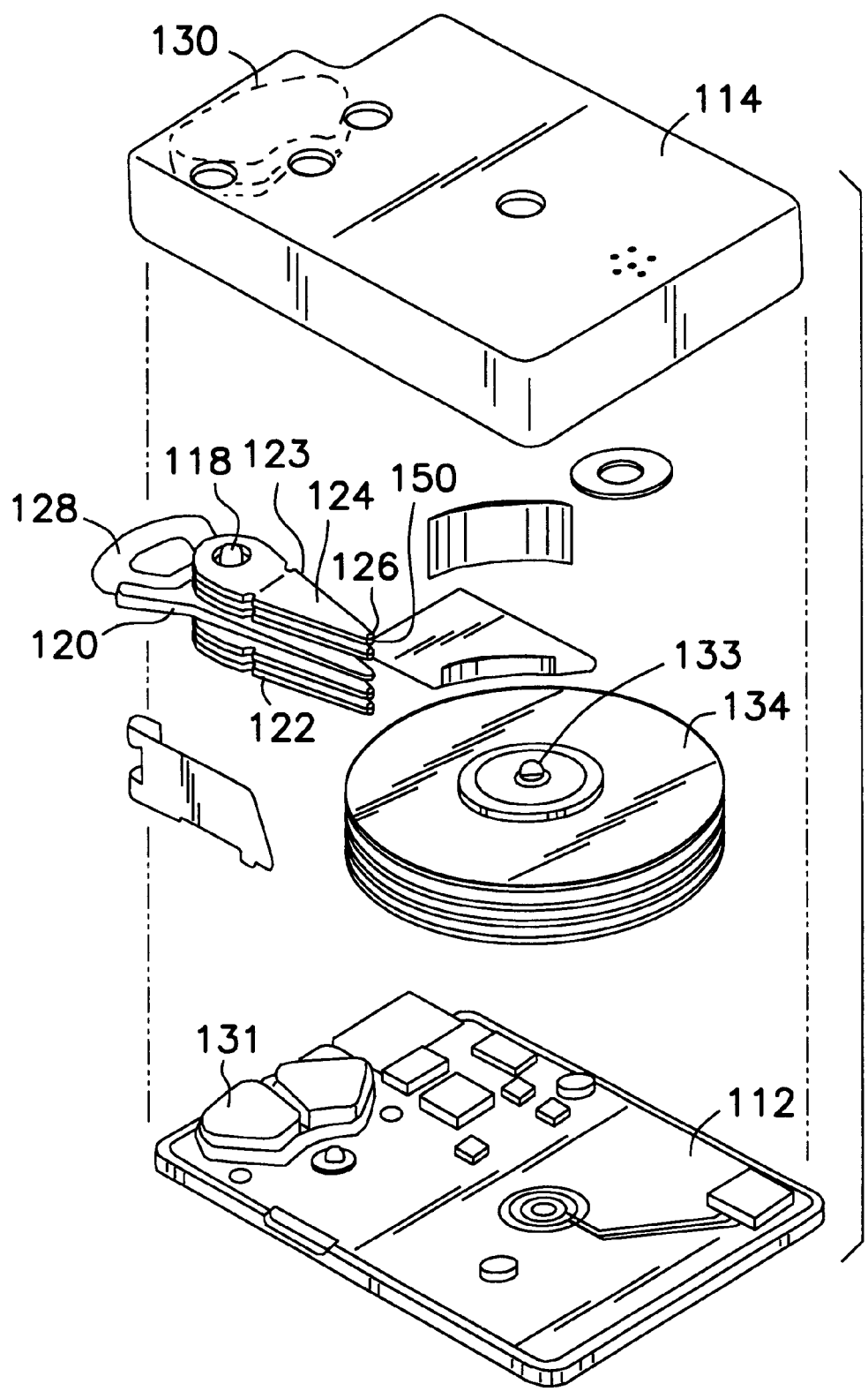
FIG. 1 is an exploded view of a disc drive with a multiple disc stack.

The invention described in this application is useful with all mechanical configurations of disc drives having either rotary or linear actuation. In addition, the invention is also useful in all types of disc drives including hard disc drives, zip drives, floppy disc drives and any other type of drives where unloading the transducer from a surface and parking the transducer may be desirable. FIG. 1 is an exploded view of one type of a disc drive 100 having a rotary actuator. The disc drive 100 includes a housing or base 112, and a cover 114. The base 112 and cover 114 form a disc enclosure. Rotatably attached to the base 112 on an actuator shaft 118 is an actuator assembly 120. The actuator assembly 120 includes a comb-like structure 122 having a plurality of arms 123. Attached to the separate arms 123 on the comb 122, are load beams or load springs 124. Load beams or load springs are also referred to as suspensions. Attached at the end of each load spring 124 is a slider 126 which carries a magnetic transducer 150. The slider 126 with the transducer 150 form what is many times called the head. It should be noted that many sliders have one transducer 150 and that is what is shown in the figures. It should also be noted that this invention is equally applicable to sliders having more than one transducer, such as what is referred to as an MR or magneto resistive head in which one transducer 150 is generally used for reading and another is generally used for writing. On the end of the actuator arm assembly 120 opposite the load springs 124 and the sliders 126 is a voice coil 128.

Attached within the base 112 is a first magnet 130 and a second magnet 131. As shown in FIG. 1, the second magnet 131 is associated with the cover 114. The first and second magnets 130, 131, and the voice coil 128 are the key components of a voice coil motor which applies a force to the actuator assembly 120 to rotate it about the actuator shaft 118. Also mounted to the base 112 is a spindle motor. The spindle motor includes a rotating portion called the spindle hub 133. In this particular disc drive, the spindle motor is within the hub. In FIG. 1, a number of discs 134 are attached to the spindle hub 133. In other disc drives a single disc or a different number of discs may be attached to the hub. The invention described herein is equally applicable to disc drives which have a plurality of discs as well as disc drives that have a single disc. The invention described herein is also equally applicable to disc drives with spindle motors which are within the hub 133 or under the hub.

Figure 2:
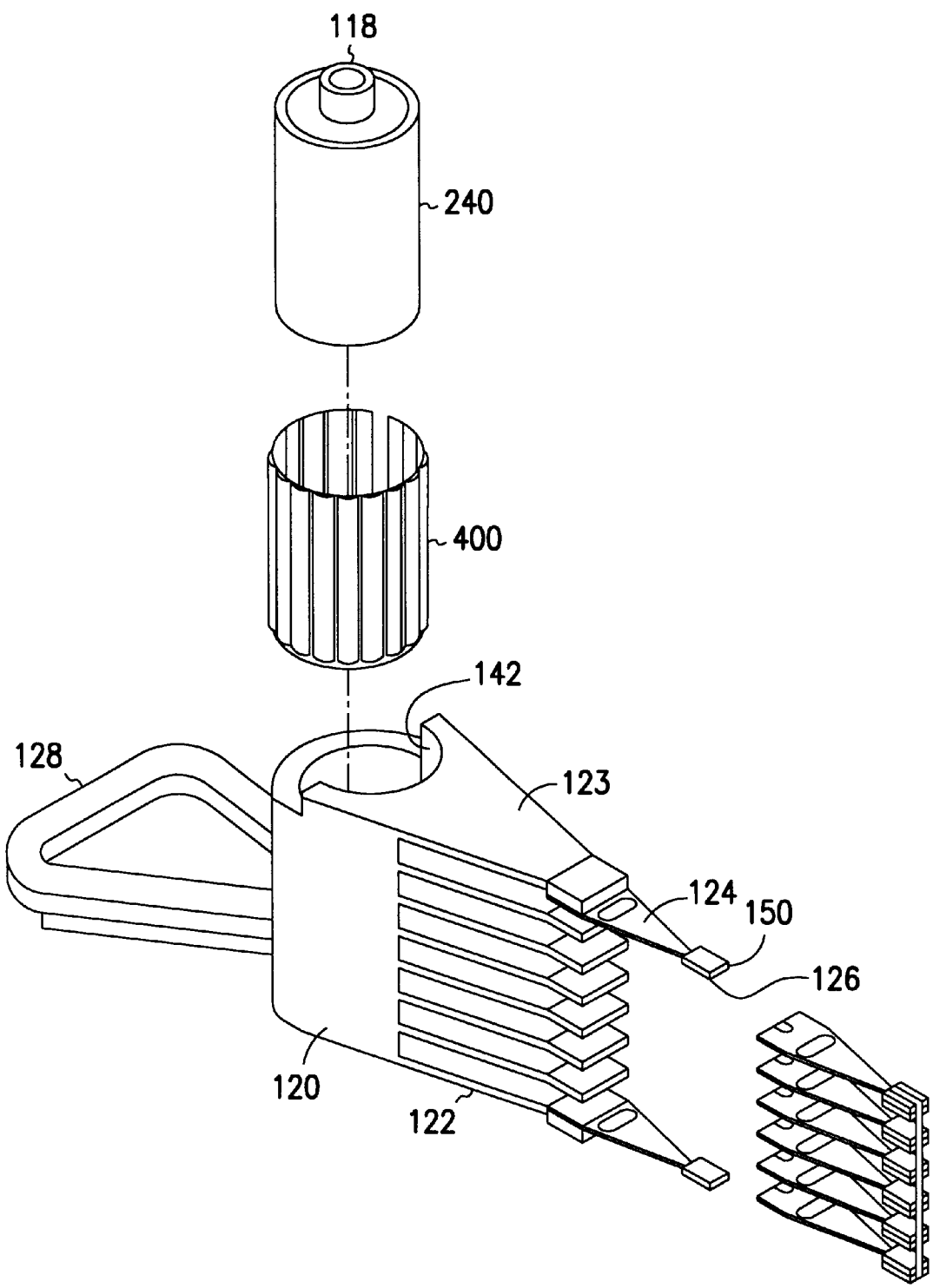
FIG. 2 is an exploded view of the actuator bearing cartridge and the actuator arm assembly of a disc drive.

FIG. 2 details the actuator arm assembly 120 in an exploded view. Each of the arms 123 of the E-block or comb assembly 122, except the arms 123 on the top and bottom of the E-block 122, carry two load springs. In this particular disk drive 100, there is a slider for both the top and bottom fingers of the E-block 122 have only one load spring 124 since these are used for the top surface of the top disk and the bottom surface of the bottom disk in the stack of disks 134. Attached to the load springs 124 are sliders 126 which include magnetic transducers which magnetize the surface of the disk 134 to represent and store desired data. As is well known in the art of disk drives, each of the disks has a series of concentric tracks onto which the magnetic information is recorded. The sliders 126 and the magnetic transducers incorporated therein are moved over the surface of a particular disk 134 so that a magnetic representation of data can be stored in any of the tracks on the disk 134. In this particular disk drive 100, the transducer movement is rotational and about the actuator shaft 118. Rotating the actuator arm assembly 120 causes the slider 126 and the transducer therein to be repositioned over surface of the disk 134.

FIG. 2 also shows that the actuator arm assembly 220 includes a bearing cartridge 240. The bearing cartridge is cylindrical in shape and includes the actuator shaft 118 about which the actuator arm assembly rotates. The actuator arm assembly 120 has a first opening or bore 242 therein. The bearing cartridge 240 fits within the bore 242 in the actuator arm assembly 120.

Figure 3:
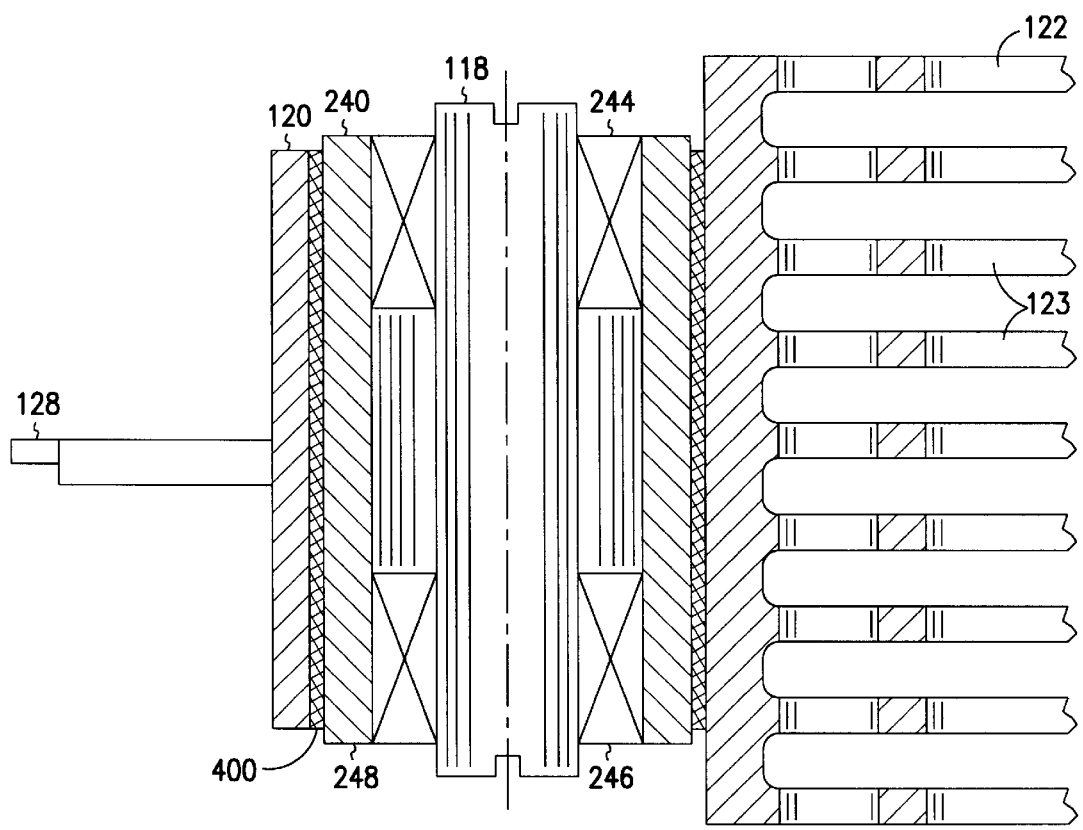
FIG. 3 is a sectional view of the actuator bearing cartridge and the actuator arm assembly of a disc drive.

FIG. 3 further details the bearing cartridge 240 and its attachment to the actuator arm assembly 120. The bearing cartridge 240 is comprised of a first bearing set 244, a second bearing set 246, an outer sleeve 248 and the shaft 118.

Figure 4:
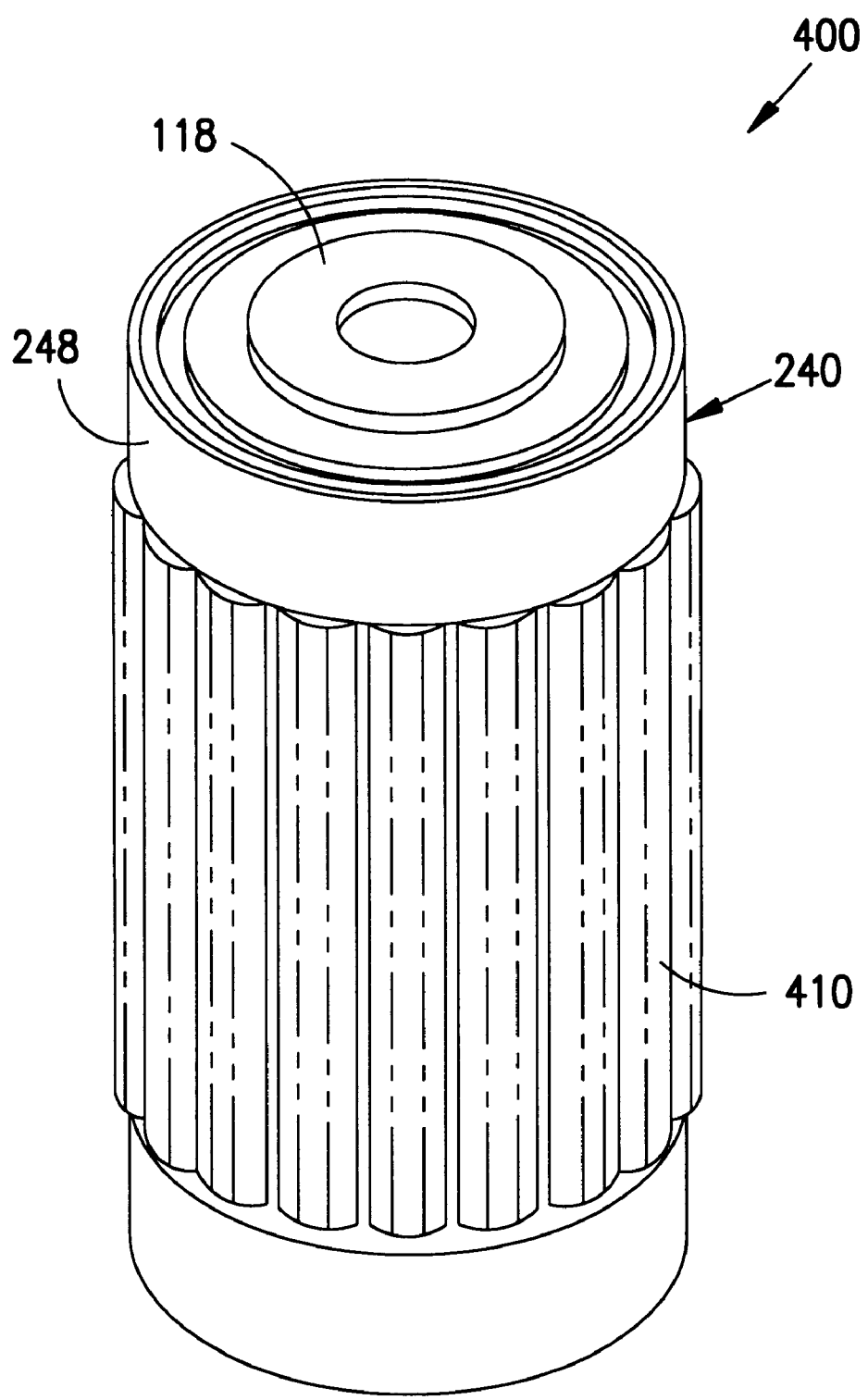
FIG. 4 is an isometric view of the bearing cartridge with the tolerance ring attached thereto.

FIG. 4 is an isometric view of a bearing cartridge 240 with a tolerance ring 400 attached thereto. The tolerance ring 400 is attached to the outer sleeve 248 of the bearing cartridge. The bearing cartridge includes an outer sleeve 248 as well as a shaft 118 upon which the outer sleeve rotates. The inner workings of the bearing cartridge 240 are described and shown in FIG. 3. Turning back once again to FIG. 4, the tolerance ring 400 is cylindrically shaped. The tolerance ring 400 includes a series of ridges 410. The ridges 410 pass along the outer sleeve 248 of the bearing cartridge. The ridges 410 are equally spaced about the periphery of the outer sleeve 248 of the bearing cartridge 240. As shown in FIG. 4, the ridges 410 are arcuate in cross-section shape. It should be noted that the tolerance ring 400 can be made in differing heights to fit bearing cartridges 240 of differing heights. Various sizes of bearing cartridges will be used in various disc drives depending upon the height and diameter of the bore or opening 242 in the E-block of the actuator assembly 120.

Figure 5:
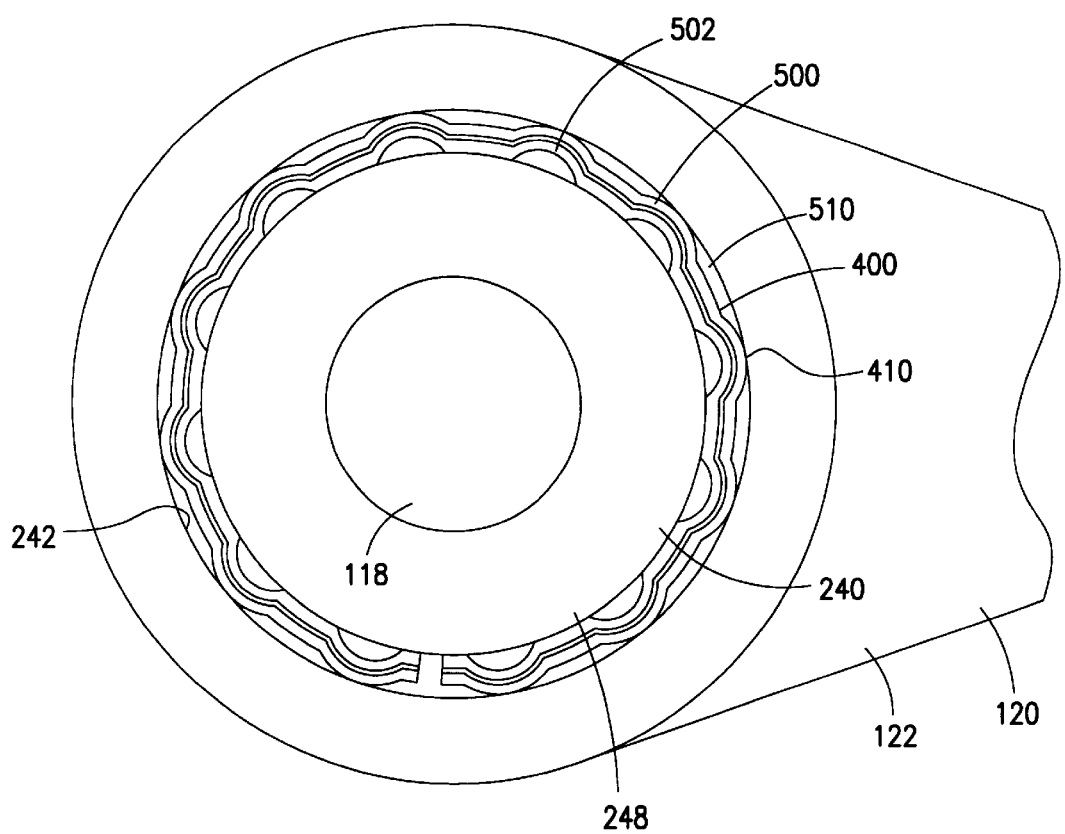
FIG. 5 is a top view of the bearing cartridge and E-block attached with a tolerance ring.

FIG. 5 is a top view of the bearing cartridge 240 and the E-block attached with a tolerance ring 400. The tolerance ring 400 is positioned between the outer sleeve 248 of the bearing cartridge 240 and the inner diameter of the bore or opening 242 in the actuator assembly 120. A major portion of the actuator assembly 120 is the E-block or comb assembly. The tolerance ring 400 includes a first constraining layer 500 and a second constraining layer 502. A layer of viscous elastic material 510 is sandwiched in between the first constraining layer 500 and the second constraining layer 502. The viscous elastic material can be an adhesive having viscous elastic properties. The viscous elastic material also may be a pressure sensitive adhesive. In a preferred embodiment, the viscous elastic material is Sony 4410 pressure-sensitive adhesive. As can be seen from FIGS. 4 and 5, the tolerance ring 400 provides a benefit since there is added compliance between the outer sleeve 248 of the bearing cartridge 240 and the inner diameter of the bore 242. The tolerance ring 400 provides for a uniform loading around the circumference of the bearing raceways, thereby reducing raceway deformation and providing several desirable bearing characteristics such as smoother operation and extended bearing life. In other words, the tolerance ring 400 distributes the holding force between the outer sleeve 248 of the bearing cartridge 240 and the inner diameter of the bore 242 around the circumference of the outer sleeve 248 of the bearing cartridge 240. Since the force used to hold the bearing cartridge 240 within the bore 242 is uniformly distributed, there is less chance for deformation of the bearing raceways (seen in FIG. 3) of the bearing cartridge 240. The tolerance ring 400 acts as a spring and provides a spring force which acts against the inner diameter of the bore or opening 242 in the actuator assembly 120 and also acts on the outer sleeve 248 of the bearing cartridge 240. The tolerance ring 400 has a plurality of bumps or ridges 410 which deform elastically to provide the spring force that presses on both of the cylindrical components.

Figure 6:
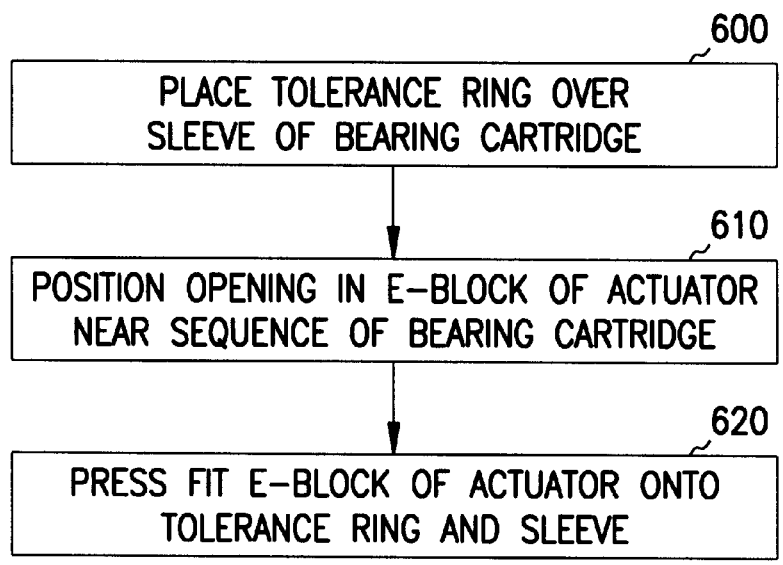
FIG. 6 is a block diagram of the bearing cartridge installation method into an E-block using a tolerance ring.

Now turning to FIG. 6, the method of manufacture or using the tolerance ring 400 to attach the bearing cartridge 240 to the actuator assembly 120 is shown. In the first step, the tolerance ring 240 is placed over the outer sleeve 248 of the bearing cartridge 240, as depicted by step 600 in FIG. 6. At this stage, the assembly appears as it does in FIG. 4. The next step is to position the opening in the E-block or the actuator assembly 120 near the sleeve 248 of the bearing cartridge 240, as depicted by step 610 in FIG. 6. Finally, the E-block is press fit onto the tolerance ring 400 and outer sleeve 248 of the bearing cartridge 240 as depicted by step 620 in FIG. 6.

Figure 7:
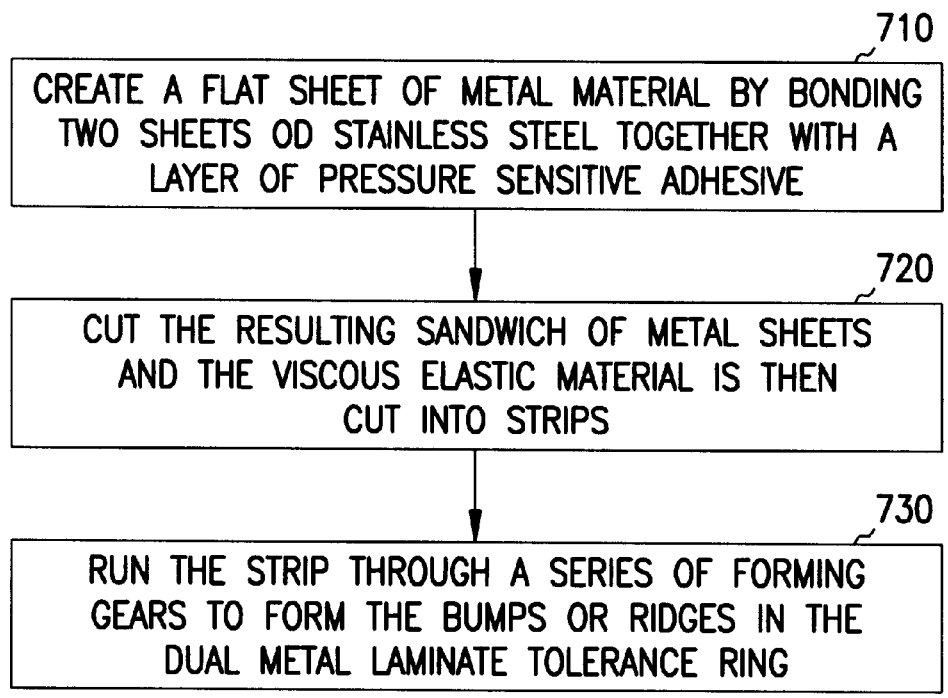
FIG. 7 is a block diagram of the method for fabricating the tolerance ring.

FIG. 7 is a block diagram of the method for fabricating the tolerance ring. A proposed method of fabricating a dual metal laminate tolerance ring 400 is to first create a flat sheet of metal material by bonding two sheets of stainless steel together with a thin layer of pressure sensitive adhesive, as depicted by reference number 710. The resulting sandwich of metal sheets and the viscous elastic material is then cut into strips, as depicted by reference number 720. Lastly, the strips would be run through a series of forming gears or stamping discs that form the bumps or ridges 410 in the dual metal laminate tolerance ring 400, as depicted by reference number 730. The dual metal laminate tolerance ring would be installed as discussed with respect to the discussion of FIG. 6 above.

The tolerance ring 400 has several advantages over other means of cylindrical component assembly such as reworkability, low cost, simplicity, and uniform loading around the circumference of the interface. For example, the tolerance ring 400 does not form a permanent bond between the bore 242 and the outer sleeve 248 of the bearing cartridge 240. As a result, the components can be easily disassembled and reassembled. Tolerance rings 400 are cheaper than providing machined or formed retention features such as screw threads or snap rings.

The tolerance ring acts as a spring between two masses, which participating as an assembly have a characteristic stiffness and natural resonance frequency. The tolerance ring 400 parameters are selected such that the natural frequency of the tolerance ring 400 does not cause vibration related problems with the actuator assembly 120. The system is designed such that the stiffness is adequate, but not excessive, to minimize the assembly forces and the deformation assembled components. This is especially true with a bearing system so that the deformation of the bearing raceways is minimized. Thus, the stiffness of the tolerance ring is often designed to provide a natural resonant frequency only slightly above other resonant frequencies associated with the actuator assembly 120.

The viscous layer 510 of the tolerance ring 400 damps relative movement of the assembled parts, which can be associated with movement or deformation of the tolerance ring. The tolerance ring 400 is designed such that the viscous layer would provide the greatest damping of cyclic vibrations near the natural resonant frequency, but would, however, provide damping at all frequencies involving significant movement or deformation of the tolerance ring.

The tolerance ring 400 adds shock and vibration damping to the actuator assembly 120. Without damping, the actuator assembly 120 behaves like an undamped, pre-loaded spring during shock and vibration events.

The tolerance ring 400 reduces acoustical noise during operation of the disc drive 100. The tolerance ring also reduces vibration induced by ball imperfections rolling against the bearing raceways (shown in FIG. 3), which could lead to significant reduction in acoustical noise.

Advantageously, the method and apparatus described for attaching the bearing cartridge and the E-block or comb to form the actuator assembly has improved settling characteristics after a track to track seek. Vibration in the actuator assembly is minimized during track following operations of the disc drive. The actuator assembly has improved vibration characteristics while under any type of servo control. The actuator assembly also accommodates thermal mismatches that might occur between the bearing cartridge and the E-block as the disc drive heats from a starting temperature to an operating temperature. The tolerance ring also absorbs vibrations resulting from imperfections in the bearings as they roll within the race of the bearing set within the bearing cartridge. Still another advantage is reduced damage to assembled components of the actuator assembly as a result of a shock event. The actuator assembly with the tolerance ring including the dampening material has reduced acoustical noise related to the rotating bearings. The actuator assembly can also be assembled using current assembly techniques.

Figure 8:
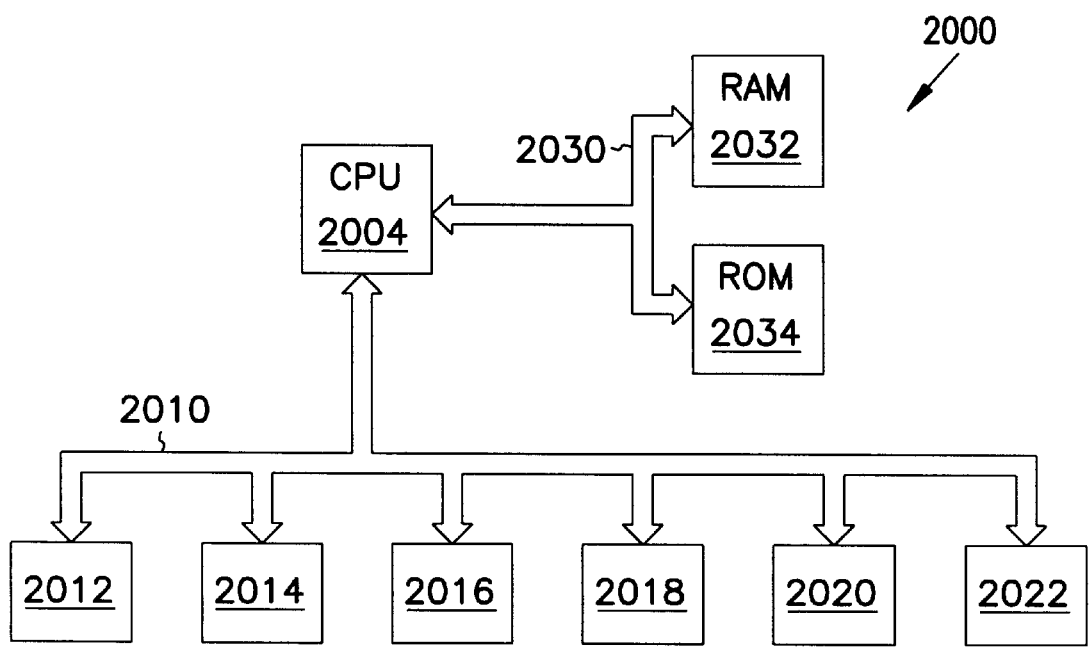
FIG. 8 is a schematic view of a computer system.

FIG. 8 is a schematic view of a computer system. Advantageously, the invention is well-suited for use in a computer system 2000. The computer system 2000 may also be called an electronic system or an information handling system and includes a central processing unit, a memory and a system bus. The information handling system includes a central processing unit 2004, a random access memory 2032, and a system bus 2030 for communicatively coupling the central processing unit 2004 and the random access memory 2032. The information handling system 2002 may also include an input/output bus 2010 and several devices peripheral devices, such as 2012, 2014, 2016, 2018, 2020, and 2022 may be attached to the input output bus 2010. Peripheral devices may include hard disc drives, magneto optical drives, floppy disc drives, monitors, keyboards and other such peripherals.

Conclusion

In conclusion, an actuator assembly 120 for a disc drive includes an E-block 122 having a cylindrical opening 142 therein and a bearing cartridge having an a cylindrical sleeve 248 . A tolerance ring 400 having a dampening material 510 therein is used to attach the sleeve 248 of the bearing cartridge to the cylindrical opening 142 of the E-block. The tolerance ring 400 includes a layer of viscoelastic material 510 which may be a viscoelastic damping adhesive material. The viscoelastic material 510 is sandwiched between the first layer 500 of metallic material and the second layer 502 of metallic material. The tolerance ring 400 a plurality of ridges 410 formed about the periphery of the tolerance ring 400. The ridges 410 may be formed in an arcuate shape or having an arcuate cross section. The tolerance ring 400 is dimensioned so that attachment of the bearing cartridge and tolerance ring 400 to the actuator assembly 120 requires a press fit. The tolerance ring 400 deforms elastically when attaching the opening 142 in the E-block 122 and the sleeve 248 of the bearing cartridge. The dimensions and parameters of the tolerance ring 400 are also selected so that the natural frequency of the actuator assembly 120 is not matched to the natural frequency of the tolerance ring. The tolerance ring 400 contacts the inner diameter of the opening 142 in the E-block 122 and the outer diameter of the sleeve 248 of the bearing. cartridge. when assembled.

A disc drive 100, includes a base 112, a disc stack rotatably attached to the base 112, and an actuator assembly 120 movably attached to the base 112. Attached to one end of the actuator assembly 120 is one or more transducers 150. The actuator assembly 120 includes arms 124 on one end for holding the one or more transducers and a portion of a voice coil motor 128, 130, 131 on the other end of the actuator assembly 120. The voice coil motor 128, 130, 131 moves the actuator assembly 120 and the transducers attached thereto to various locations over the disc where data is located. The actuator assembly 120 has an opening 142 therein. A bearing cartridge is attached to the opening 142 in the actuator assembly. A tolerance ring 400 is used to attach the bearing cartridge to the opening 142 in the actuator assembly. The tolerance ring 400 includes a dampening material 510 therein. The tolerance ring 400 includes a layer of viscoelastic material 510 which can be a viscoelastic damping adhesive material 510 which may be a pressure sensitive adhesive. The viscoelastic material 510 is sandwiched between the first layer 500 of metallic material and the second layer 502 of metallic material. The tolerance ring 400 contains a plurality of ridges 410 formed about the periphery of the tolerance ring. The ridges 410 may be formed in an arcuate shape or having an arcuate cross section. The tolerance ring 400 is dimensioned so that attachment of the bearing cartridge and tolerance ring 400 to the actuator assembly 120 requires a press fit. The dimensions of the tolerance ring 400 are selected so that the natural frequency of the actuator assembly 120 is not matched to the natural frequency of the tolerance ring.

The disc drive has an actuator assembly 120 with an opening 142 therein. The disc drive includes a bearing cartridge having an a cylindrical sleeve 248 having an outside diameter less than the inner diameter of the opening 142 in the actuator assembly. The disk drive includes a device for attaching the sleeve 248 of the bearing cartridge to the cylindrical opening 142 of the actuator assembly.

It is to be understood that the above description is intended to be illustrative, and not restrictive. Many other embodiments will be apparent to those of skill in the art upon reviewing the above description. The scope of the invention should, therefore, be determined with reference to the appended claims, along with the full scope of equivalents to which such claims are entitled.

what is claimed is:

1. An actuator assembly for a disc drive comprising:
   an E-block having a cylindrical opening therein;
   a bearing cartridge having a cylindrical sleeve; and
   a tolerance ring further comprising:
      a first constraining layer;
      a second constraining layer; and
      a dampening material, the tolerance ring attaching the sleeve of the bearing cartridge to the cylindrical opening of the E-block.

2. The actuator assembly for a disc drive of claim 1 wherein the dampening material comprises a layer of viscoelastic material.

3. The actuator assembly of claim 1 wherein the sleeve of the bearing cartridge has an inner surface and an outer surface, the tolerance ring positioned on the outer surface of the sleeve.

4. The actuator assembly for a disc drive of claim 1 wherein the first constraining layer is a metallic material, the second constraining layer is a metallic material, and the layer of dampening material is a viscoelastic material sandwiched between the first constraining layer of metallic material and the second constraining layer of metallic material.

5. The actuator assembly for a disc drive of claim 4 wherein at least one of the first constraining layer of metallic material and the second constraining layer of metallic material includes a plurality of ridges formed about the tolerance ring periphery.

6. The actuator assembly for a disc drive of claim 4 wherein at least one of the first constraining layer of metallic material and the second constraining layer of metallic material includes a plurality of arcuate ridges formed about the tolerance ring periphery.

7. The actuator assembly for a disc drive of claim 4 wherein at least one of the first constraining layer of metallic material and the second constraining layer of metallic material, includes a plurality of ridges formed about the tolerance ring periphery, the ridges being dimensioned so that the tolerance ring deforms elastically when attaching the opening in the E-block and the sleeve of the bearing cartridge.

8. The actuator assembly for a disc drive of claim 4 wherein at least one of the first constraining layer of metallic material and the second constraining layer of metallic material includes a plurality of ridges formed about the tolerance ring periphery, the ridges being dimensioned so that the tolerance ring deforms elastically when attaching the opening in the E-block and the sleeve of the bearing cartridge, the tolerance ring contacting an inner diameter of the opening in the E-block and an outer diameter of the sleeve of the bearing cartridge.

9. The actuator assembly for a disc drive of claim 4 wherein at least one of the first constraining layer of metallic material and the second constraining layer of metallic material includes a plurality of ridges formed about the tolerance ring periphery, wherein dimensions of the tolerance ring are selected such that a natural frequency of the actuator assembly is unmatched to a natural frequency of the tolerance ring.

10. The actuator assembly for a disc drive of claim 1 wherein the dampening material comprises a layer of viscoelastic damping adhesive material.

11. The actuator assembly for a disc drive of claim 10 wherein the viscoelastic damping adhesive material is a pressure sensitive adhesive.

12. A disc drive comprising:
   a base;
   a disc rotatably attached to the base; and
   an actuator assembly rotatably attached to the base, the actuator assembly having an opening therein, the actuator assembly further comprising:
      a block having a portion of a voice coil on one end and a plurality of arms on the other end;
      a bearing cartridge having an a cylindrical sleeve; and
      a tolerance ring further comprising:
         a first constraining layer;
         a second constraining layer; and
         a dampening material, the tolerance ring attaching the sleeve of the bearing cartridge to the cylindrical opening of the actuator assembly.

13. The disc drive of claim 12 wherein the dampening material comprises a layer of viscoelastic damping adhesive material.

14. The disc drive of claim 13 wherein the viscoelastic damping adhesive material is a pressure sensitive adhesive.

15. The disc drive of claim 12 wherein the first constraining layer is a metallic material, the second constraining layer is a metallic material, and the layer of dampening material is a viscoelastic material sandwiched between the first constraining layer of metallic material and the second constraining layer of metallic material.

16. The disc drive of claim 15 wherein at least one of the first constraining layer of metallic material or the second constraining layer of metallic material includes a plurality of ridges formed about the periphery of the tolerance ring.

17. The disc drive of claim 15 wherein at least one of the first constraining layer of metallic material and the second constraining layer of metallic material includes a plurality of ridges formed about the tolerance ring periphery, the ridges being dimensioned so that the tolerance ring deforms elastically when attaching the opening in the actuator assembly and the sleeve of the bearing cartridge.

18. The disc drive of claim 15 wherein at least one of the first constraining layer of metallic material and the second constraining layer of metallic material includes a plurality of ridges formed about the tolerance ring periphery, the ridges dimensioned so that the tolerance ring deforms elastically when attaching the opening in the actuator assembly and the sleeve of the bearing cartridge, the tolerance ring contacting the inner diameter of the opening in the actuator assembly and the outer diameter of the sleeve of the bearing cartridge.

19. The disc drive of claim 15 wherein at least one of the first constraining layer of metallic material and the second constraining layer of metallic material includes a plurality of ridges formed about the tolerance ring periphery, wherein the dimensions of the tolerance ring are selected such that the natural frequency of the actuator assembly is unmatched to the natural frequency of the tolerance ring.

20. The disc drive of claim 12 wherein the dampening material comprises a layer of viscoelastic material.

21. A disc drive including an actuator assembly having an opening therein, said disc drive comprising:
   a bearing cartridge having an a cylindrical sleeve having an outside diameter less than an inner diameter of the opening in the actuator assembly; and
   means for dampening vibration in the disc drive and attaching the sleeve of the bearing cartridge to the cylindrical opening of the actuator assembly.

22. The disc drive of claim 20 wherein the means for dampening vibration in the disc drive and attaching the sleeve of the bearing cartridge to the cylindrical opening of the actuator assembly comprises a tolerance ring further comprising:
   a constraining layer; and
   a layer of dampening material.

23. The disc drive of claim 20 wherein the means for dampening vibration in the disc drive and attaching the sleeve of the bearing cartridge to the cylindrical opening of the actuator assembly comprises a tolerance ring further comprising:
   a first constraining layer;
   a second constraining layer; and
   a dampening material.

* * * * *